United States Patent
Sugimoto et al.

(10) Patent No.: US 6,844,083 B2
(45) Date of Patent: Jan. 18, 2005

(54) MAGNETO-OPTICAL RECORDING MEDIUM POSSESSING A MAGNETIC ASSIST LAYER

(75) Inventors: Toshio Sugimoto, Kawasaki (JP); Ken Tamanoi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/629,215

(22) Filed: Jul. 29, 2003

(65) Prior Publication Data

US 2004/0023072 A1 Feb. 5, 2004

Related U.S. Application Data

(63) Continuation of application No. PCT/JP01/01048, filed on Feb. 14, 2001.

(51) Int. Cl.⁷ ............................................. G11B 11/105
(52) U.S. Cl. .................... 428/611; 428/673; 428/686; 428/212; 428/694 ML; 428/694 MM; 369/13.41; 369/13.5; 369/13.51
(58) Field of Search ................................ 428/611, 686, 428/212, 673, 694 ML, 694 MM, 694 EC, 694 IS; 369/13.41, 13.5, 13.51, 13.42, 13.45, 13.46

(56) References Cited

U.S. PATENT DOCUMENTS 6,180,268 B1 * 1/2001 Tamanoi et al. ..... 428/694 ML

FOREIGN PATENT DOCUMENTS

| JP | 63-179435 | | 7/1988 |
| JP | 2-158938 | | 6/1990 |
| JP | 2-244441 | | 9/1990 |
| JP | 4-067338 | | 3/1992 |
| JP | 5-205336 | | 8/1993 |
| JP | 7-014230 | | 1/1995 |
| JP | 7-085516 | | 3/1995 |
| JP | 10-340491 | | 12/1998 |
| JP | 11-016219 | | 1/1999 |
| JP | 11-110839 | A * | 4/1999 |
| JP | 11-126384 | | 5/1999 |

OTHER PUBLICATIONS

JPO Abstract Translation of JP 11–110839 A (Doc. ID : JP411110839 A).*

* cited by examiner

*Primary Examiner*—Kevin M. Bernatz
(74) *Attorney, Agent, or Firm*—Greer, Burns & Crain, Ltd.

(57) ABSTRACT

A magneto-optical recording medium has a configuration such that information recorded can be read from a region smaller than a beam spot by applying an external magnetic field and directing a light beam in reproducing. The magneto-optical recording medium includes a magnetic recording layer for recording and holding information, a magnetic reproducing layer provided on one side of the magnetic recording layer on which the light beam is incident, a nonmagnetic layer provided on another side of the magnetic recording layer opposite to the magnetic reproducing layer, and a magnetic assist layer provided on the nonmagnetic layer. The magnetic assist layer has a coercive force smaller than an external magnetic field applied in recording or reproducing information.

8 Claims, 9 Drawing Sheets

MAGNETO-OPTICAL RECORDING MEDIUM POSSESSING A MAGNETIC ASSIST LAYER

This is a continuation of International Application No. PCT/JP01/01048, filed Feb. 14, 2001, which was not published in English.

BACKGROUND OF THE INVENTION

1. Field of the Invention

The present invention relates generally to a magneto-optical recording medium, and more particularly to a magneto-optical recording medium improved in recording magnetic field sensitivity and reproducing characteristics.

2. Description of the Related Art

A magneto-optical disk has received attention as a memory medium that becomes a core in the recent rapid development of multimedia, and it is desired to have a larger recording capacity. The recording capacity of a magneto-optical disk may be increased by a method of reducing the width of a groove on a substrate to thereby increase a radial recording capacity or by a method of reducing the length of a recording mark to thereby increase a tangential recording capacity.

A method of recording marks on a magneto-optical disk is generally classified into a light intensity modulation recording method and a magnetic modulation recording method as known in the art. The light intensity modulation recording method is performed by first ordering the direction of magnetization to a downward direction, for example, before recording (i.e., erasing data) and next directing a pulsed laser beam according to information to be recorded in the condition where an external magnetic field is applied in an upward direction. By applying the upward external magnetic field to a region where the temperature has been raised by irradiation with the laser beam, the magnetization in this region only can be oriented in the upward direction, thereby forming a recording mark according to the information to be recorded in this region.

On the other hand, the magnetic modulation recording method is performed by first continuously directing a laser beam to raise the temperature of the disk up to a temperature at which the coercive force of a recording layer is lowered, and next applying an external magnetic field larger than or equal to the coercive force as modulated upward and downward. By modulating the external magnetic field according to information to be recorded, the magnetization in the corresponding region can be oriented in the upward or downward direction, thereby forming a recording mark according to the information to be recorded.

It is known that the magnetic modulation recording method is advantageous over the light intensity modulation recording method as the method of recording a shorter mark. To reduce the recording mark length, high-frequency recording is required. However, increasing a recording frequency in the magnetic modulation recording method is accompanied by a reduction in effective current flowing in a magnetic head due to high-frequency loss, causing a problem that a sufficient magnetic field cannot be generated. Further, the distribution of a magnetic field generated from the core of the recording head is not uniform, so that there arises another problem that an effective recording magnetic field required for recording is reduced. Also in the light intensity modulation recording method, there arises a problem that when a recording magnetic field and an erasing magnetic field are large, the power consumption by a magnetic field generating circuit is increased to cause an increase in size of the magnetic field generating circuit. Accordingly, it is desirable to reduce the recording magnetic field and the erasing magnetic field.

A technique for improving recording magnetic field sensitivity is described in Japanese Patent Laid-open No. 5-298764. In this technique, a magnetic film having a composition such that rare earth sublattice magnetization is dominant at room temperature is used as a recording layer, and a rare earth-transition metal amorphous alloy film having a composition such that transition metal sublattice magnetization is dominant at a temperature for forming a recording magnetic domain in the recording layer is formed on either side of the recording layer. However, this method cannot improve a C/N characteristic.

Further, a method of reducing the diameter of a beam spot is known as the method for increasing the recording capacity. The beam spot diameter can be reduced by shortening the wavelength of a laser beam used for recording and reproduction from a conventional wavelength of 780 nm or 680 nm generally used in the related art or by enlarging the numerical aperture (NA) of a lens from a conventional NA of 0.55. However, in the case of using this method, there occur a noise increase due to an increase in power density in the beam spot and a carrier reduction due to a reduction in reproducing power (a reduction in light quantity) in the beam spot, thus causing a degradation in C/N characteristic.

SUMMARY OF THE INVENTION

It is therefore an object of the present invention to provide a magneto-optical recording medium which can reduce a recording magnetic field and improve a C/N characteristic.

In accordance with an aspect of the present invention, there is provided a magneto-optical recording medium including a magnetic recording layer for recording and holding information; a nonmagnetic layer provided on one side of the magnetic recording layer opposite to another side on which a light beam is incident; and a magnetic assist layer provided on the nonmagnetic layer. The magnetic assist layer has a coercive force smaller than an external magnetic field applied in recording or reproducing information.

Preferably, the magnetic assist layer has magnetic isotropy, and it comprises a multilayer film composed of nonmagnetic metal and transition metal, for example. Further, the Curie temperature (Tc1) of the magnetic recording layer is preferably lower than the Curie temperature (tc2) of the magnetic assist layer.

In accordance with another aspect of the present invention, there is provided a magneto-optical recording medium having a configuration such that information recorded can be read from a region smaller than a beam spot by applying an external magnetic field and directing a light beam in reproducing. The magneto-optical recording medium includes a magnetic recording layer for recording and holding information; a magnetic reproducing layer provided on one side of the magnetic recording layer on which the light beam is incident; a nonmagnetic layer provided on another side of the magnetic recording layer opposite to the magnetic reproducing layer; and a magnetic assist layer provided on the nonmagnetic layer. The magnetic assist layer has a coercive force smaller than an external magnetic field applied in recording or reproducing information.

Preferably, the magnetic assist layer has magnetic isotropy, and it comprises a multilayer film composed of nonmagnetic metal and transition metal, for example.

Alternatively, the magnetic assist layer may comprise a rare earth-transition metal amorphous alloy film such as a GdFeCo film.

In the present invention, the magnetic recording layer and the magnetic assist layer having a small coercive force are arranged with the nonmagnetic layer interposed therebetween. Accordingly, the magnetization in the magnetic assist layer is oriented in the same direction as that of an external magnetic field applied in recording or reproducing information, so that a recording magnetic field can be reduced and a C/N characteristic can be improved.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
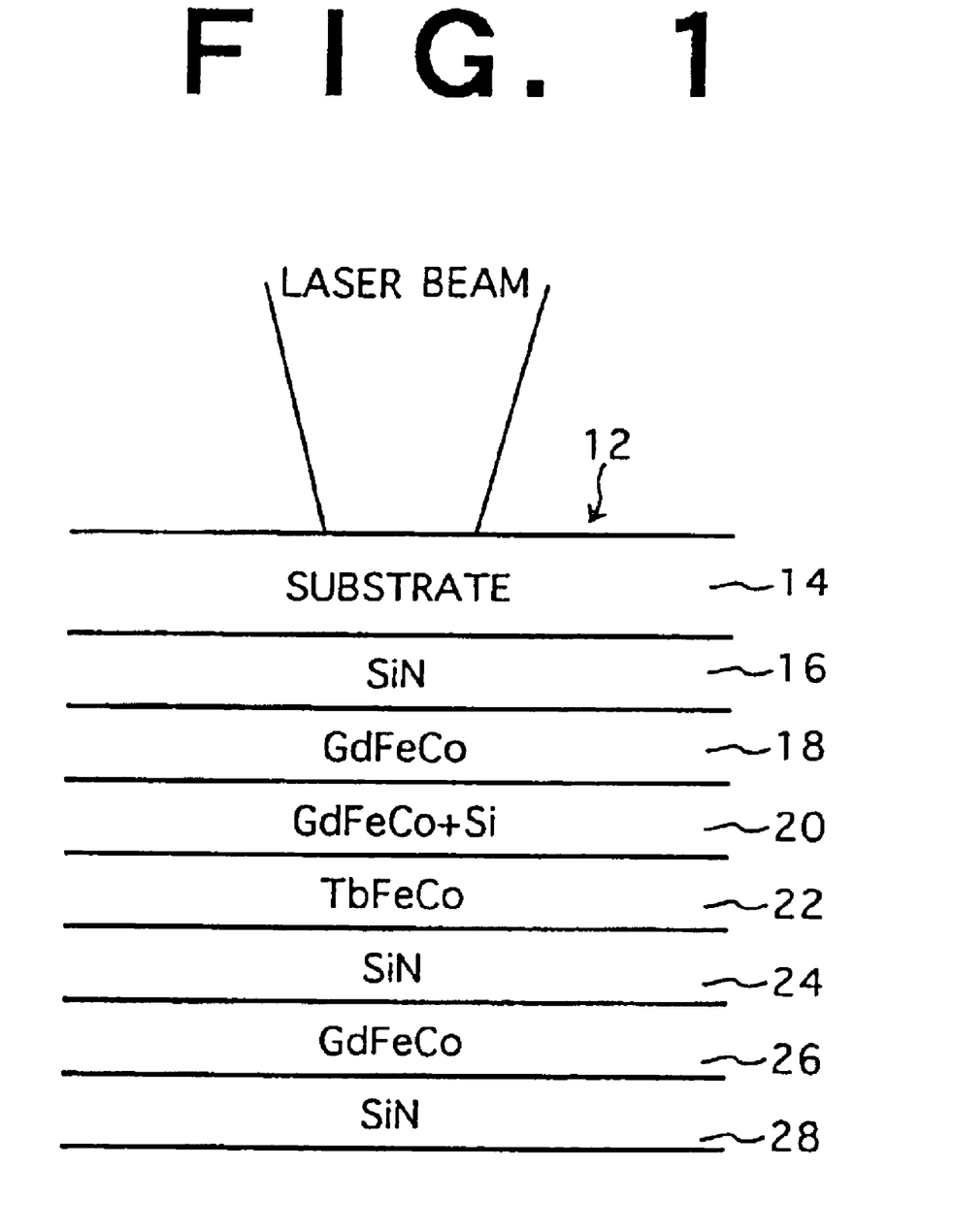
FIG. 1 is a vertical sectional view showing the configuration of a magneto-optical recording medium according to a first preferred embodiment of the present invention.

Referring to FIG. 1, there is shown a sectional view of a magneto-optical recording medium 12 according to a first preferred embodiment of the present invention. The magneto-optical recording medium 12 usually has the form of a disk. Reference numeral 14 denotes a transparent substrate formed of glass or the like. A dielectric layer 16 of SiN is formed on the transparent substrate 14. The dielectric layer 16 prevents oxidation and corrosion of a magnetic layer formed thereon. Resins such as polycarbonate, polymethylmethacrylate, and amorphous polyolefin may also be adopted as the transparent substrate 14. Further, metal nitrides such as SiN and AlN, metal oxides such as $SiO_2$ and $Al_2O_3$, and metal sulfides such as ZnS may also be adopted as the dielectric layer 16.

A magnetic reproducing layer 18 of GdFeCo is formed on the dielectric layer 16. The magnetic reproducing layer 18 has an axis of easy magnetization in a direction perpendicular to its layer surface. The magnetic reproducing layer 18 is metal-dominant, or metal-rich such that the magnetic moment of transition metal is dominating over the magnetic moment of rare earth. The Curie temperature of the magnetic reproducing layer 18 is about 250° C. to about 300° C.

A magnetic intermediate layer 20 of GdFeCoSi is formed on the magnetic reproducing layer 18. The magnetic intermediate layer 20 is rare earth-rich such that the magnetic moment of rare earth is dominating over the magnetic moment of transition metal, and has an axis of easy magnetization in a longitudinal direction at room temperature. The axis (direction) of easy magnetization of the magnetic intermediate layer 20 changes from the longitudinal direction to the perpendicular direction at a temperature higher than or equal to a predetermined temperature at which this layer 20 is heated by a reproducing beam power. This predetermined temperature is preferably about 130° C. or more. The Curie temperature of the magnetic intermediate layer 20 is about 200° C. or less.

A magnetic recording layer 22 of TbFeCo is formed on the magnetic intermediate layer 20. The magnetic recording layer 22 has an axis of easy magnetization in a direction perpendicular to its layer surface. The Curie temperature of the magnetic recording layer 22 is about 250° C. to about 270° C., and its compensation temperature is room temperature. A first nonmagnetic layer 24 of SiN is formed on the magnetic recording layer 22. A magnetic assist layer or magnetic bias layer 26 of GdFeCo is formed on the first nonmagnetic layer 24.

The magnetic assist layer 26 is RE rich such that the magnetic moment of rare earth is dominating over the magnetic moment of transition metal. The Curie temperature of the magnetic assist layer 26 is about 300° C. The magnetic assist layer 26 has an axis of easy magnetization in a longitudinal direction at room temperature. The axis (direction) of easy magnetization of the magnetic assist layer 26 changes from the longitudinal direction to the perpendicular direction at a relatively high temperature (about 200° C.). For example, the composition of the magnetic assist layer 26 is $Gd_{29}Fe_{58}Co_{13}$. A second nonmagnetic layer 28 of SiN is formed on the magnetic assist layer 26.

These layers 16 to 28 were sequentially formed by DC sputtering. The sputtering conditions were set to a gas pressure of 0.8 Pa and an applied power of 0.8 kW for the SiN layers 16, 24, and 28 and a gas pressure of 0.5 to 0.8 Pa and an applied power of 0.5 to 0.8 kW for the magnetic layers 18, 20, 22, and 26. The layers 16 to 28 were formed in a vacuum chamber capable of achieving an ultimate vacuum of $5 \times 10^{-5}$ Pa or less. The thicknesses of the dielectric layer 16, the reproducing layer 18, the intermediate layer 20, the recording layer 22, the first nonmagnetic layer 24, the assist layer 26, and the second nonmagnetic layer 28 were set to 90 nm, 40 nm, 40 nm, 50 nm, 5 nm, 40 nm, and 15 nm, respectively.

Figure 2:
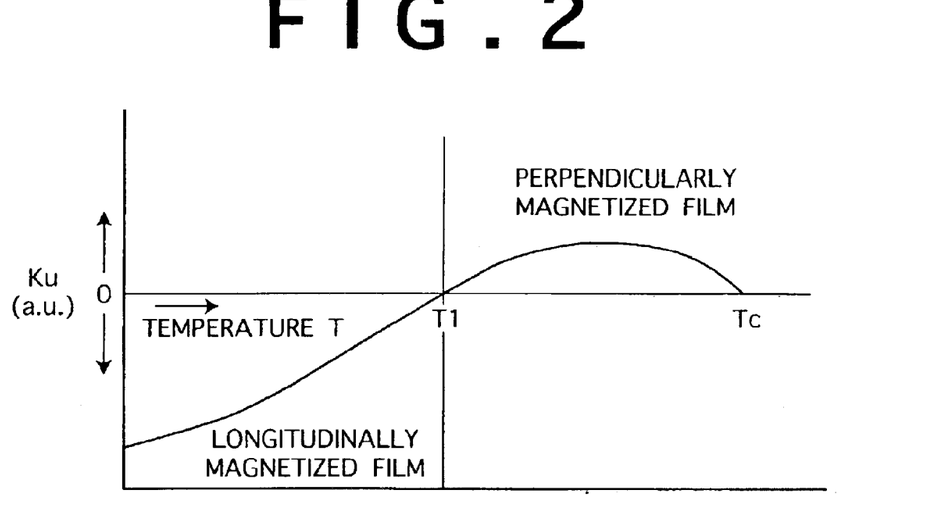
FIG. 2 is a graph showing the temperature dependence of magnetic anisotropy of a magnetic assist layer in the first preferred embodiment.
Figure 3:
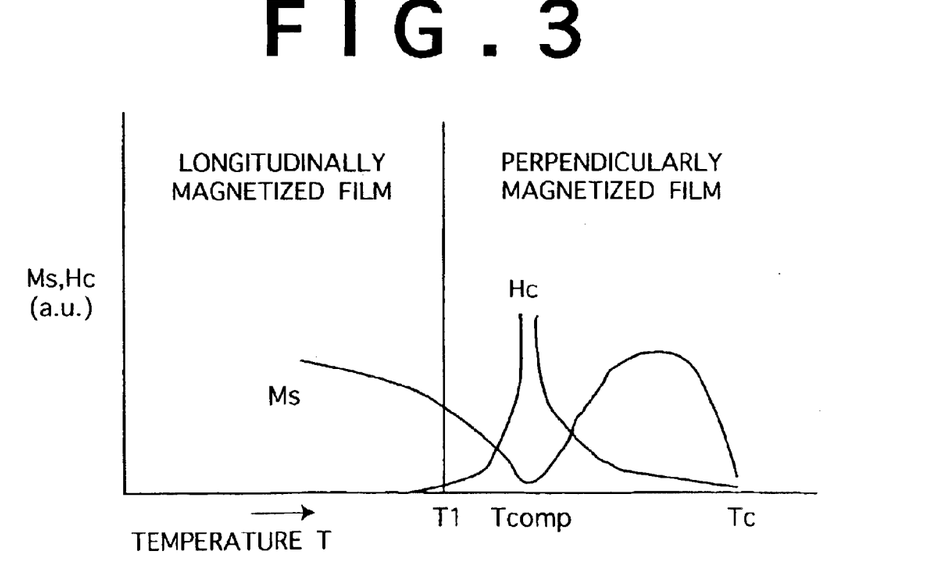
FIG. 3 is a graph showing the temperature dependence of saturation magnetization Ms and coercive force Hc of the magnetic assist layer in the first preferred embodiment.

As mentioned above, the magnetic assist layer 26 is RE rich (rare earth magnetization dominant at room temperature), and its Curie temperature is about 300° C. Thus, the Curie temperature of the magnetic assist layer 26 is high, so that the magnetization in the magnetic assist layer 26 is not lost in a temperature range attained by irradiation with a laser beam having a write or erase power. The magnetic characteristics of the magnetic assist layer 26 are shown in FIGS. 2 and 3. FIG. 2 shows the temperature dependence of magnetic anisotropy of the magnetic assist layer 26, in which the longitudinally magnetized film changes to the perpendicularly magnetized film at a temperature T1 of about 200° C. FIG. 3 shows the temperature dependence of saturation magnetization Ms and coercive force Hc of the magnetic assist layer 26.

The Curie temperature Tc1 of the recording layer 22 is about 250° C. to 270° C., and the Curie temperature Tc2 of the assist layer 26 is about 300° C. That is, Tc1<Tc2. The magnetic assist layer 26 has a compensation temperature Tcomp higher than T1. The magnetic assist layer 26 has a coercive force Hc2 smaller than an external magnetic field applied in recording or reproducing information (recording magnetic field Hw or reproducing magnetic field Hr). That is, Hc2<Hw, Hr.

Figure 4:
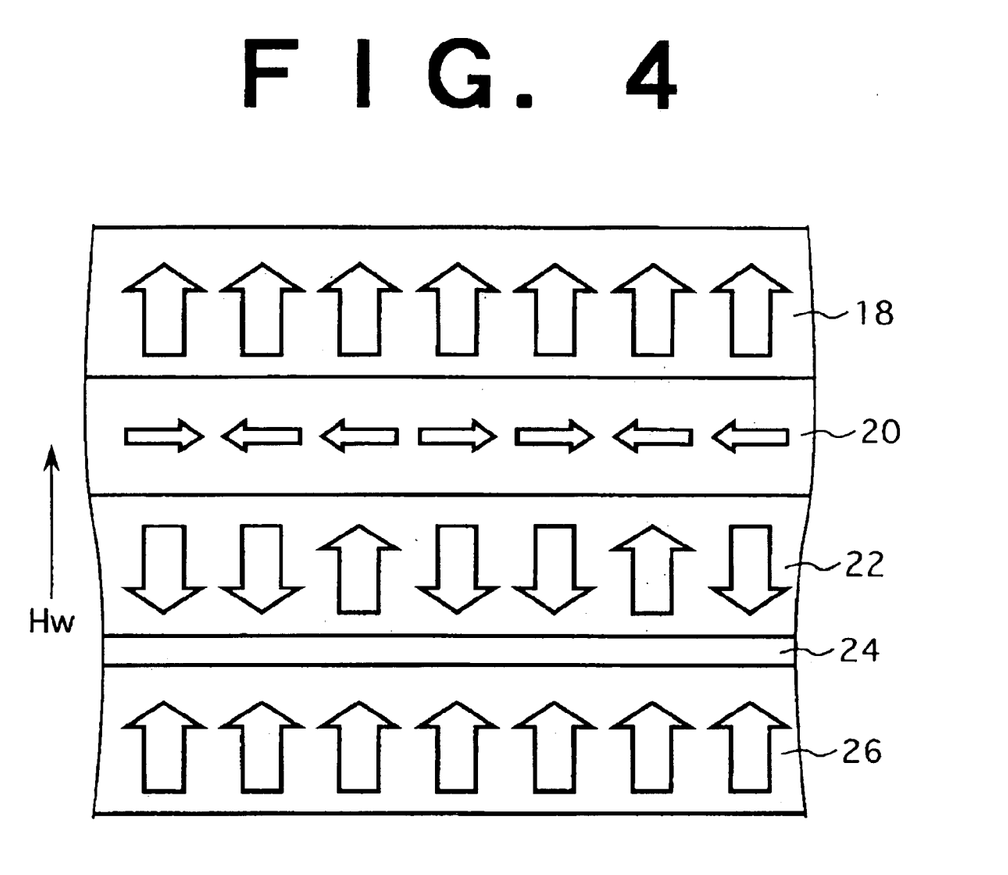
FIG. 4 is a vertical sectional view for illustrating data writing in the first preferred embodiment.
Figure 5A:
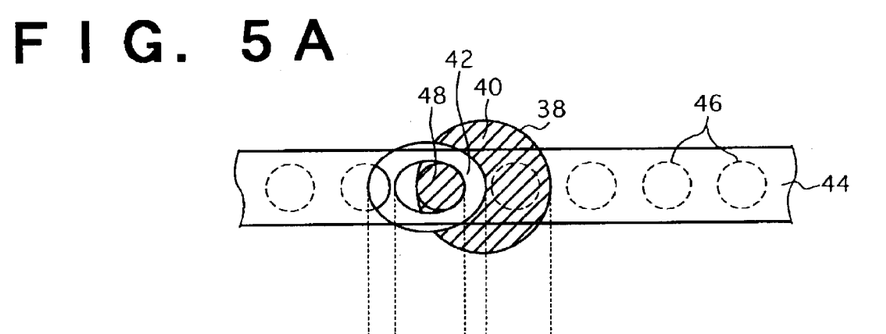
FIGS. 5A and 5B are a plan view and a vertical sectional view of a part of the recording medium, respectively, for illustrating a data reproducing method in the first preferred embodiment.
Figure 5B:
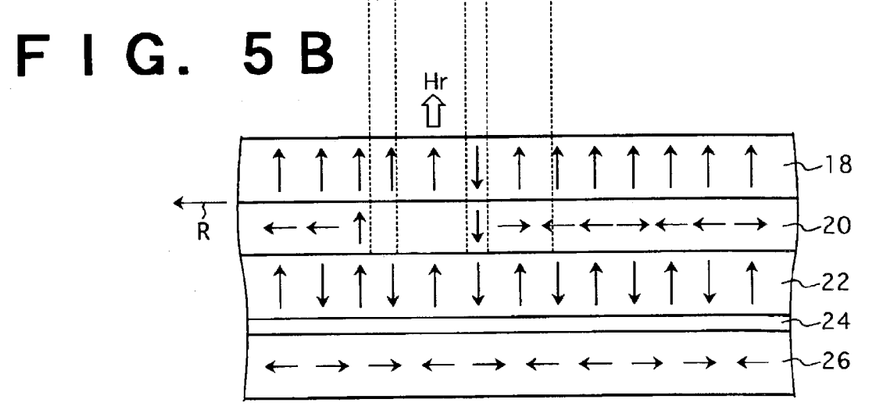

A data erasing method, writing method, and reading method using the magneto-optical recording medium 12 according to this preferred embodiment will now be described in brief with reference to FIGS. 4 to 5B. First, the data erasing method will now be described. A laser beam is directed onto the recording medium as applying a bias magnetic field Hb in the downward direction to heat the recording layer 22 to a temperature higher than or equal to the Curie temperature of the recording layer 22, thereby ordering the magnetization in the recording layer 22 in the downward direction to erase the data.

The data writing method will now be described with reference to FIG. 4. In writing data, an intense laser beam is directed onto only a recording portion on the medium as applying a recording bias magnetic field Hw in a direction opposite to the erasing direction, i.e., in the upward direction. As a result, the direction of the magnetization at only the recording portion is inverted to the upward direction. The assist layer 26 has a coercive force Hc2 smaller than the recording magnetic field Hw, so that the magnetization in the assist layer 26 is easily oriented in the direction of the recording magnetic field by applying the recording magnetic field Hw, and the leakage magnetic field from the assist layer 26 acts as a bias magnetic field for assisting the recording magnetic field Hw. Accordingly, the recording magnetic field Hw can be reduced. When the recording medium is moved apart from the laser beam, the temperature of the recording medium lowers to room temperature. At room temperature, the reproducing layer 18 and the recording layer 22 are magnetically coupled through the intermediate layer 20.

Figure 6:
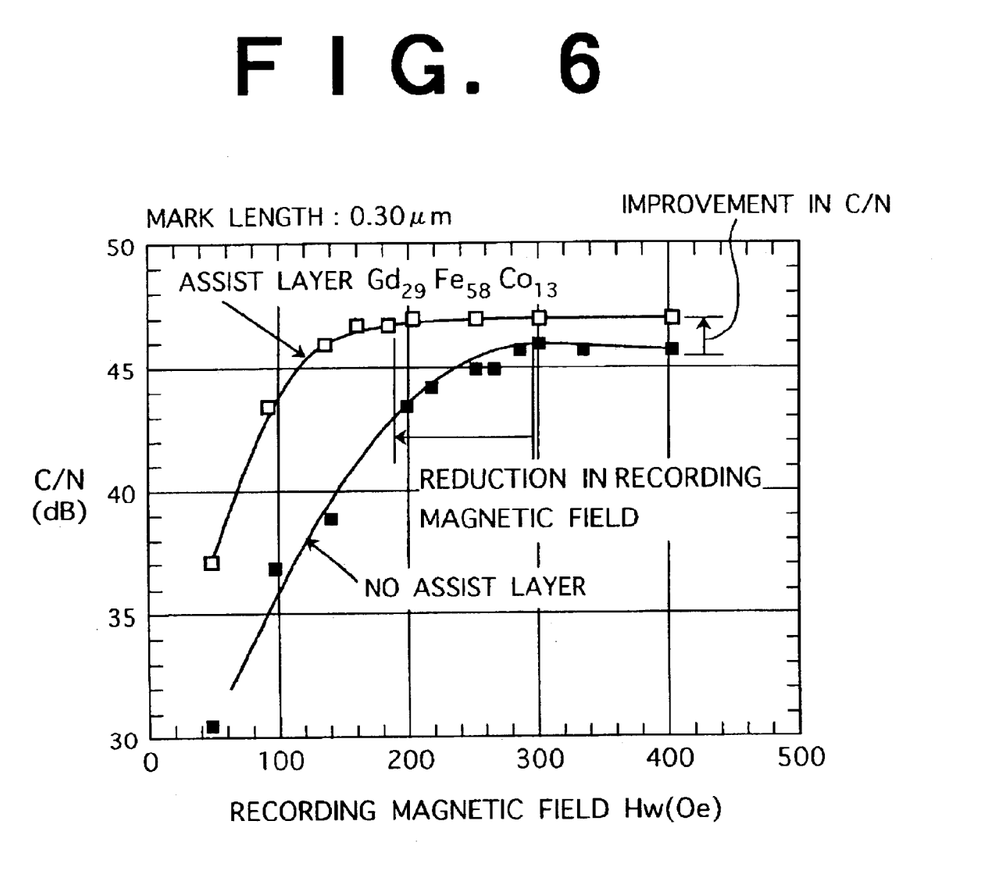
FIG. 6 is a graph showing the relation between C/N and recording/reproducing magnetic field of the medium according to the first preferred embodiment in comparison with a medium in the related art.

Referring to FIG. 6, there is shown a recording magnetic field characteristic of the medium according to this preferred embodiment in the case of magnetic modulation recording. As apparent from FIG. 6, the recording magnetic field of the MSR medium having the assist layer according to this preferred embodiment is about 200 oersteds (Oe), whereas the recording magnetic field of an MSR medium having no assist layer as a comparison is 300 oersteds (Oe), and the C/N decreases at 300 Oe or less. Thus, the recording magnetic field can be reduced according to this preferred embodiment. Further, the recording magnetic field can be sufficiently ensured, so that the C/N characteristic can be improved at a lower magnetic field.

A data double-mask reproducing method will now be described with reference to FIGS. 5A and 5B. When a sufficiently intense reproducing laser beam is directed onto the recording medium, there are formed in a beam spot 38 a low-temperature region where the magnetization in the reproducing layer 18 is oriented in the direction of a reproducing bias magnetic field Hr, an intermediate-temperature region where the magnetization in the recording layer 22 is transferred to the intermediate layer 20 and the reproducing layer 18 by exchange coupling, and a high-temperature region where the temperature in this region is not less than the Curie temperature Tc of the intermediate layer 20 as shown in FIGS. 5A and 5B. As shown in FIG. 5A, a plurality of marks 46 shown by the broken lines are formed in a track 44. In the low-temperature region and the high-temperature region, there are formed up-spin masks 40 and 48 where the direction of the magnetization in the reproducing layer 18 coincides with the direction of the bias magnetic field Hr. An aperture 42 is formed in the intermediate-temperature region between the two up-spin masks 40 and 48.

The assist layer 26 is a longitudinally magnetized film at a temperature raised by the reproducing laser beam power, so that the leakage magnetic field from the assist layer 26 has little effect on the reproducing magnetic field Hr. At the up-spin mask 48, the recording medium is heated to a temperature not less than the Curie temperature Tc of the intermediate layer 20, so that the magnetization in the intermediate layer 20 disappears and the reproducing layer 18 and the recording layer 22 are not magnetically coupled with each other.

Accordingly, the magnetization in the reproducing layer 18 is oriented in the direction of the reproducing bias magnetic field Hr because the reproducing layer 18 has a small coercive force at room temperature. That is, the direction of the magnetization in the reproducing layer 18 is always upward at a temperature not less than the Curie temperature Tc of the intermediate layer 20, and the reproducing layer 18 functions as a kind of mask through which no magneto-optical signal is output. Accordingly, the very small aperture 42 through which data recorded in the recording layer 22 is read can be formed. Further, the aperture 42 is formed at a central portion of the beam spot 38 where the laser intensity is higher than that at an edge portion of the beam spot 38, so that a large magneto-optical signal can be obtained.

This preferred embodiment has the following advantages.

The magnetic characteristics of the assist layer 26 can be arbitrarily set independently of the recording layer 22 because no exchange coupling occurs therebetween. If exchange coupling occurs between the recording layer and the assist layer, it would be required to find out optimum conditions between the magnetic characteristics of the recording layer and the magnetic characteristics of the assist layer, causing a narrow margin of the composition of each layer. Since the coercive force of the assist layer 26 is small, the magnetization therein can be easily oriented in the direction of an applied magnetic field. As a result, a leakage magnetic field can be generated in a recording direction or erasing direction. Accordingly, the assist layer 26 is effective in recording or erasing, and it is not necessary to initialize the assist layer 26.

There will now be described a magneto-optical recording medium according to a second preferred embodiment of the present invention. Although not especially shown, a multilayer film having the same configuration as that in the first preferred embodiment is formed on the substrate 14. In the second preferred embodiment, a magnetic assist layer 26' is used. The composition of the magnetic assist layer 26' is Gd$_{25}$Fe$_{67}$Co$_8$. The magnetic assist layer 26' has a Curie temperature of about 300° C. and is RE rich (rare earth magnetization dominant at room temperature). The magnetic assist layer 26' having the above composition is a perpendicularly magnetized film in a temperature range from a lower temperature to near the Curie temperature of the recording layer, and becomes a longitudinally magnetized film at temperatures higher than the Curie temperature of the recording layer. Further, the compensation temperature of the magnetic assist layer 26' is not higher than the Curie temperature of the intermediate layer 20.

Figure 7A:
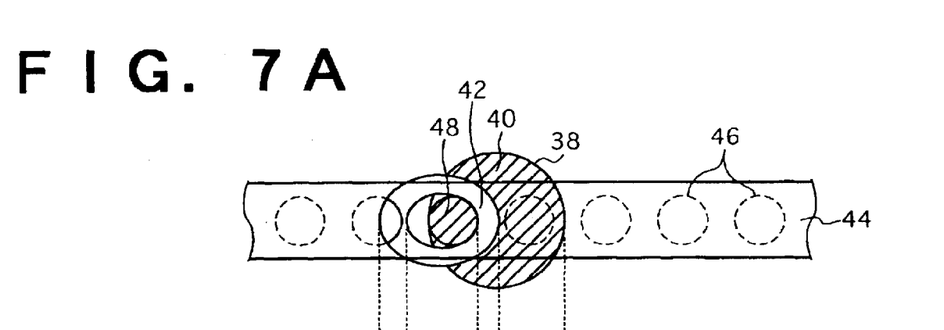
FIGS. 7A and 7B are a plan view and a vertical sectional view of a part of a recording medium according to a second preferred embodiment, respectively, for illustrating a data reproducing method in the second preferred embodiment.
Figure 7B:
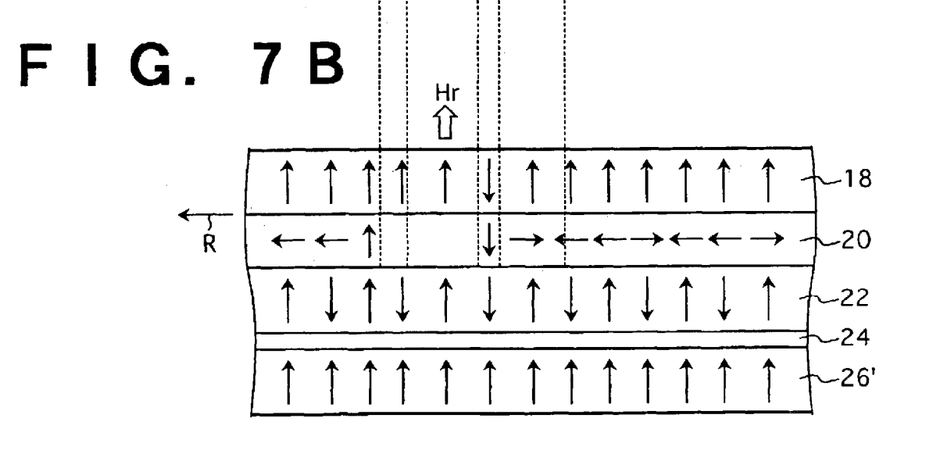

A data reproducing method in this preferred embodiment will now be described with reference to FIGS. 7A and 7B. In this preferred embodiment, the magnetic assist layer 26' is a perpendicularly magnetized film at a temperature raised by a reproducing laser beam. Accordingly, also in reproducing data, the magnetization in the assist layer 26' can be easily oriented in the direction of a reproducing magnetic field by applying a reproducing bias magnetic field Hr, and a leakage magnetic field from the assist layer 26' acts as a bias magnetic field for assisting the reproducing magnetic field Hr. Accordingly, the reproducing bias magnetic field Hr can be reduced in this preferred embodiment.

Figure 8:
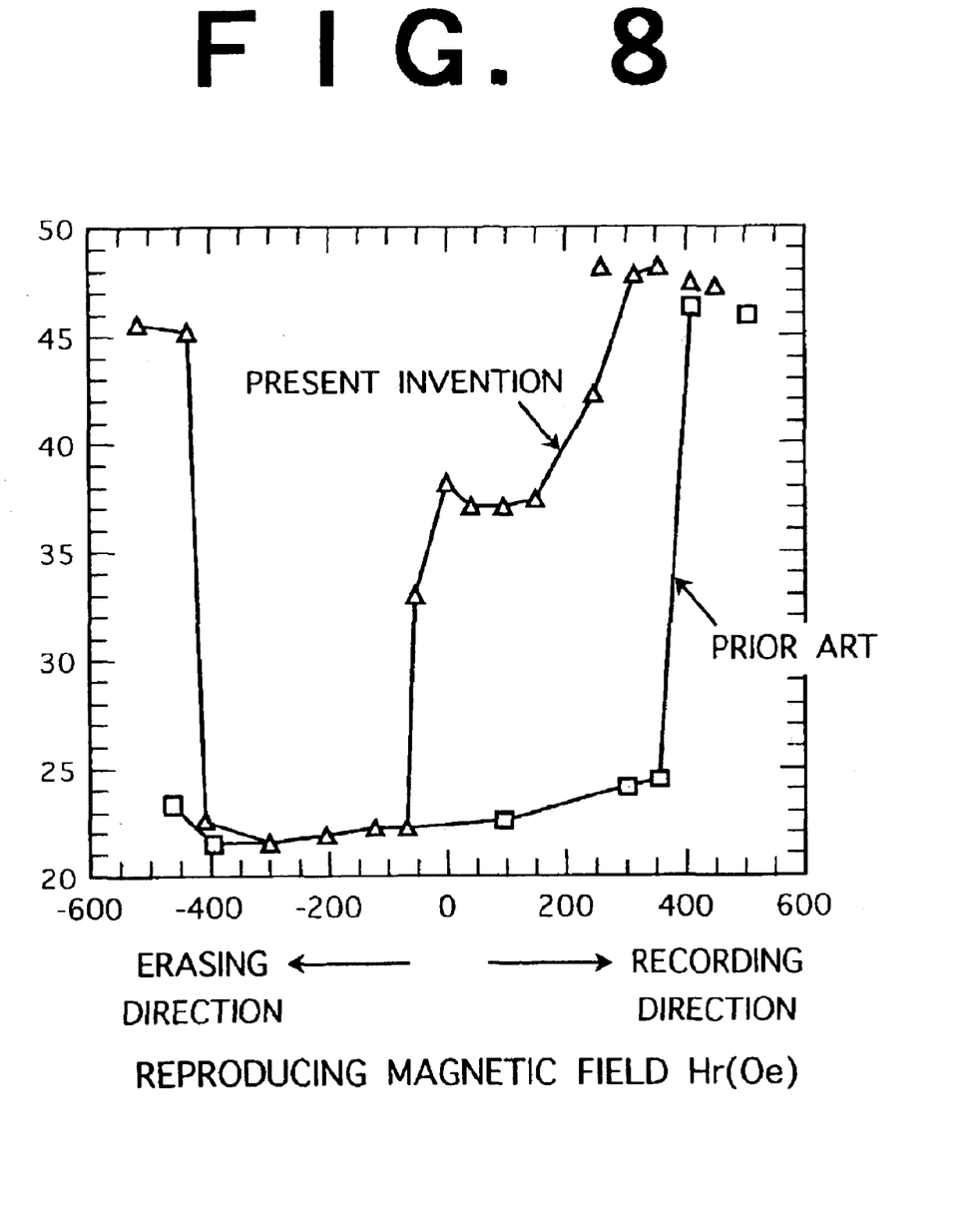
FIG. 8 is a graph showing the dependence of C/N on a reproducing magnetic field of the medium according to the second preferred embodiment in comparison with a medium in the related art.

FIG. 8 shows the reproducing magnetic field dependence of C/N of the medium according to the second preferred embodiment in comparison with the related art. As apparent from FIG. 8, the reproducing magnetic field at which the C/N is saturated can be reduced as compared with the related art, thus improving the C/N characteristic.

Figure 9:
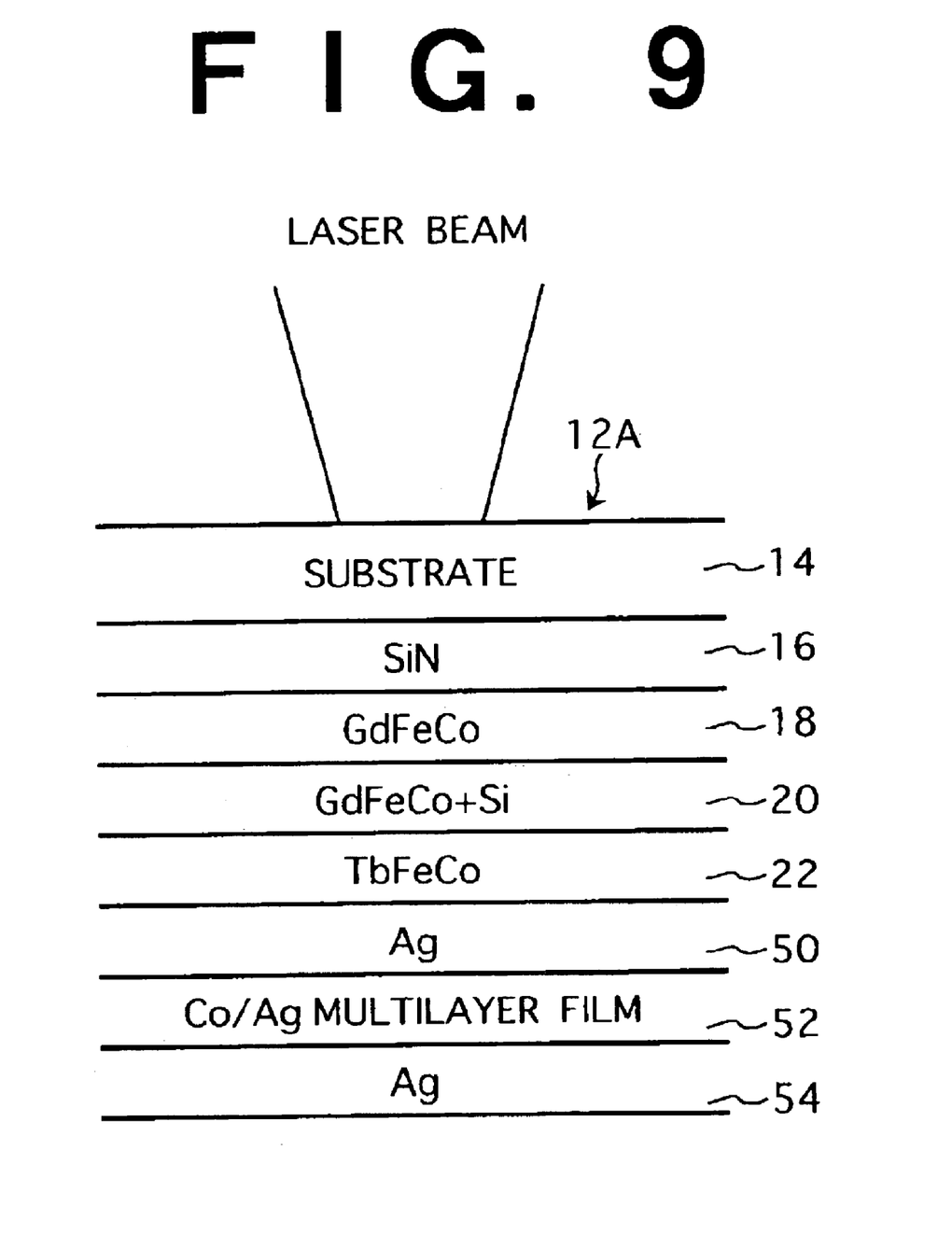
FIG. 9 is a vertical sectional view showing the configuration of a magneto-optical recording medium according to a third preferred embodiment of the present invention.

FIG. 9 shows a schematic configuration of a magneto-optical recording medium 12A according to a third preferred embodiment of the present invention. In the magneto-optical recording medium 12A of this preferred embodiment, a dielectric layer 16 of SiN, a reproducing layer 18 of GdFeCo, an intermediate layer 20 of GdFeCoSi, and a recording layer 22 of TbFeCo are sequentially formed on a substrate 14 by DC sputtering. Thereafter, a first nonmagnetic layer 50 of Ag, a magnetic assist layer 52 of Ag and Co alternately deposited, and a second nonmagnetic layer 54 of Ag are sequentially formed by RF sputtering.

The recording layer 22 has a Curie temperature of about 220° C., and its compensation temperature is room temperature. The sputtering conditions for the layers 16, 18, 20, and 22 were set similar to those in the first preferred embodiment. In an example of the magneto-optical recording medium 12A, the conditions of the RF sputtering for deposition of the first nonmagnetic layer 50 of Ag, the magnetic assist layer 52 of Co/Ag multilayer film, and the second nonmagnetic layer 54 of Ag were set to a gas pressure of 1 to 3 Pa and an applied power of 0.1 to 0.2 kW.

The thicknesses of the dielectric layer 16, the reproducing layer 18, the intermediate layer 20, the recording layer 22, the first nonmagnetic layer 50, the assist layer 52, and the second nonmagnetic layer 54 were set to 90 nm, 40 nm, 40 nm, 50 nm, 2 nm, 20 nm, and 0.4 nm, respectively. The 2-nm thick first nonmagnetic layer 50 of Ag was formed on the recording layer 22, so as to cut an exchange coupling force between the recording layer 22 and the magnetic assist layer 52. Thereafter, the 20-nm thick assist layer 52 was formed on the first nonmagnetic layer 50 by alternately depositing Co films and Ag films.

Figure 10:
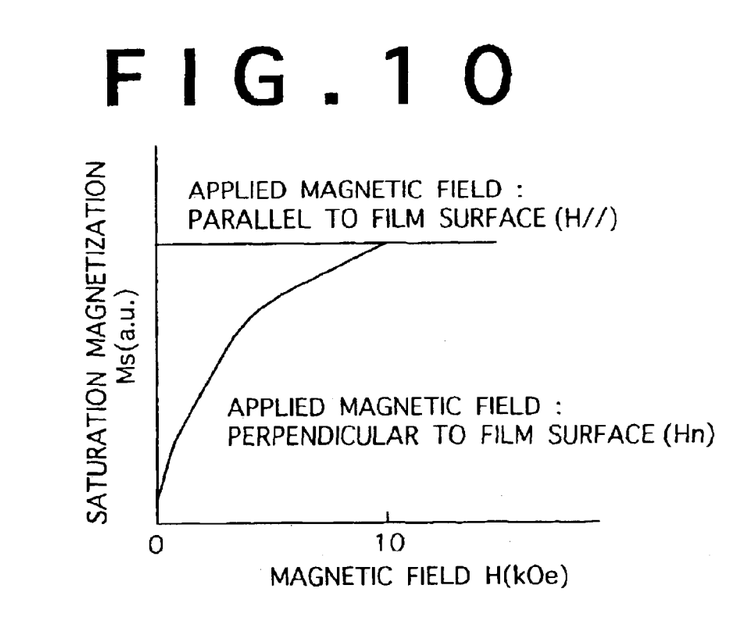
FIG. 10 is a graph showing a magnetization curve of a Co/Ag multilayer film in the case that the deposition period of Ag layers and Co layers is relatively long.
Figure 11:
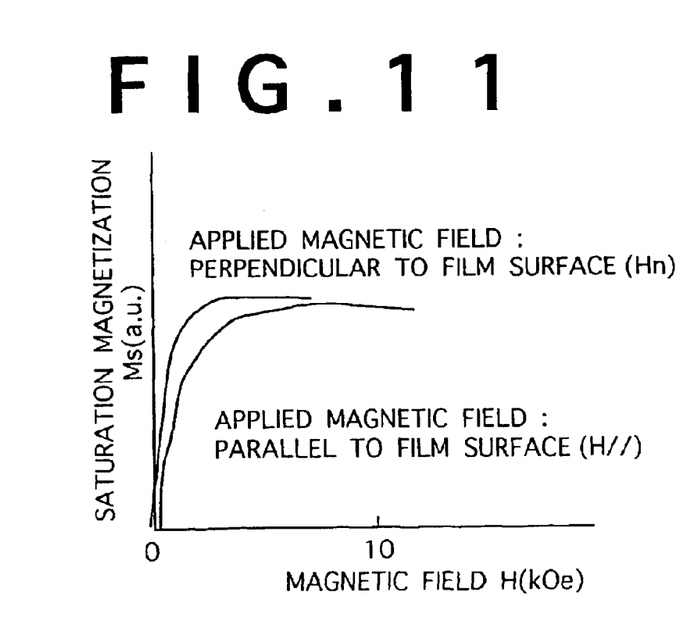
FIG. 11 is a graph showing a magnetization curve of the Co/Ag multilayer film in the case that this deposition period is relatively short.

FIG. 10 shows a magnetization curve of the magnetic assist layer 52 evaluated by a vibrating sample magnetometer in the case that Co films each having a thickness of 2.5 nm and Ag films each having a thickness of 6.3 nm were alternately deposited, that is, in the case that the deposition period of the Co films and the Ag films was set relatively long. In contrast, FIG. 12 shows a magnetization curve of the magnetic assist layer 52 in the case that Co films each having a thickness of 0.3 nm and Ag films each having a thickness of 0.75 nm were alternately deposited, that is, in the case that the deposition period of the Co films and the Ag films was set relatively short. Letting t1 and t2 denote the thickness of each Co film and the thickness of each Ag film, respectively, t1/t2=0.4 in each case. As apparent from FIG. 10, the magnetic assist layer 52 has magnetic anisotropy in the case that the deposition period is long. On the other hand, when the deposition period becomes short, it is observed that the magnetic anisotropy is almost lost and the magnetic characteristic of the assist layer 52 approaches magnetic isotropy as shown in FIG. 11.

Each Co film itself has intense longitudinal magnetic anisotropy. However, by reducing the deposition period, perpendicular magnetic anisotropy due to interfacial magnetic anisotropy is induced, so that the magnetic characteristic of the magnetic assist layer 52 approaches magnetic isotropy as a whole. For this reason, the Co/Ag multilayer film 52 in this preferred embodiment is formed by reducing the deposition period. Both in the case that the deposition period is long as shown in FIG. 10 and in the case that the deposition period is short as shown in FIG. 11, the coercive force Hc is about 100 oersteds (Oe) or less.

Thus, the magnetic assist layer 52 in this preferred embodiment has magnetic isotropy and a sufficiently small coercive force Hc, so that the magnetization in the magnetic assist layer 52 can be easily oriented in the direction of an external applied magnetic field. Accordingly, by providing the magnetic assist layer 52 formed from a Co/Ag multilayer film, not only a recording magnetic field, but also a reproducing magnetic field can be reduced. As the result of evaluation of the recording magnetic field characteristic and the reproducing magnetic field characteristic of the magneto-optical recording medium 12A according to this preferred embodiment, it was confirmed that both the recording magnetic field and the reproducing magnetic field required for saturation of C/N are lower than those in the related art. As a modification of this preferred embodiment, a Co/Ag granular film having a thickness of 20 nm may be formed as the magnetic assist layer 52. Also in this case, it was confirmed that both the recording magnetic field and the reproducing magnetic field can be reduced as in the third preferred embodiment.

While the present invention is applied to a magnetically induced super resolution medium (MSR medium) in each preferred embodiment, the present invention is not limited to this medium, but is similarly applicable also to a normal magneto-optical recording medium having no reproducing layer. In the case of a normal magneto-optical recording medium, the leakage magnetic field from the magnetic assist layer assists a recording magnetic field in recording data, thereby allowing a reduction in the recording magnetic field.

Further, the present invention is applicable to various types of MSR media such as a double-mask rear aperture detection (DRAD) type, center aperture detection (CAD) type, and magnetic amplifying magnet optical system (MAMMOS) type.

According to the present invention, it is possible to reduce a recording magnetic field and improve a C/N characteristic by providing a magnetic assist layer not making exchange coupling with a recording layer. Further, the use of the magneto-optical recording medium according to the present invention can contribute to a reduction in power consumption by a magnetic field generating circuit and to a size reduction of a magneto-optical disk drive.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A magneto-optical recording medium comprising:
   a magnetic recording layer for recording and holding information;
   a nonmagnetic layer provided on one side of said magnetic recording layer opposite to another side on which a light beam is incident; and
   a magnetic assist layer provided on said nonmagnetic layer;
   said magnetic assist layer having a coercive force smaller than an external magnetic field applied in recording or reproducing information;
   wherein said magnetic assist layer has magnetic isotropy.

2. A magneto-optical recording medium according to claim 1, wherein the Curie temperature (Tc1) of said magnetic recording layer is lower than the Curie temperature (Tc2) of said magnetic assist layer.

3. A megneto-optical recording medium according to claim 1, wherein said magnetic assist layer comprises a myltilayer film composed of nonmagnetic metal and transition metal.

4. A magneto-optical recording medium according to claim 3, wherein said multilayer film comprises Ag and Co alternately deposited.

5. A magneto-optical recording medium having a configuration such that information recorded can be read from a region smaller than a beam spot by applying an external magnetic field and directing a light beam in reproducing, said magneto-optical recording medium comprising:
   a magnetic recording layer for recording and holding information;
   a magnetic reproducing layer provided on one side of said magnetic recording layer on which said light beam is incident;
   a nonmagnetic layer provided on another side of said magnetic recording layer opposite to said magnetic reproducing layer; and
   a magnetic assist layer provided on said nonmagnetic layer;
   said magnetic assist layer having a coercive force smaller than an external magnetic field applied in recording or reproducing information;
   wherein said magnetic assist layer has magnetic isotropy.

6. A magneto-optical recording medium according to claim 5, wherein the Curie temperature (Tc1) of said magnetic recording layer is lower than the Curie temperature (Tc2) of said magnetic assist layer.

7. A magneto-optical recording medium according to claim 5, wherein said magnetic assist layer comprises a multilayer film including nonmagnetic metal and transition metal.

8. A magneto-optical recording medium according to claim 7, wherein said multilayer film comprises Ag and Co alternately deposited.

* * * * *